July 22, 1930.  R. C. KIVLEY  1,770,985
APPARATUS FOR CONTINUOUSLY SHEATHING CORES OF MATERIAL
Filed May 29, 1926
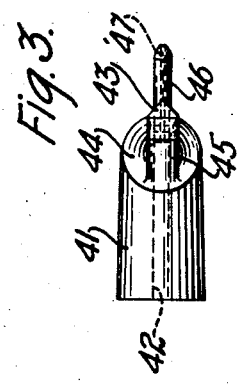
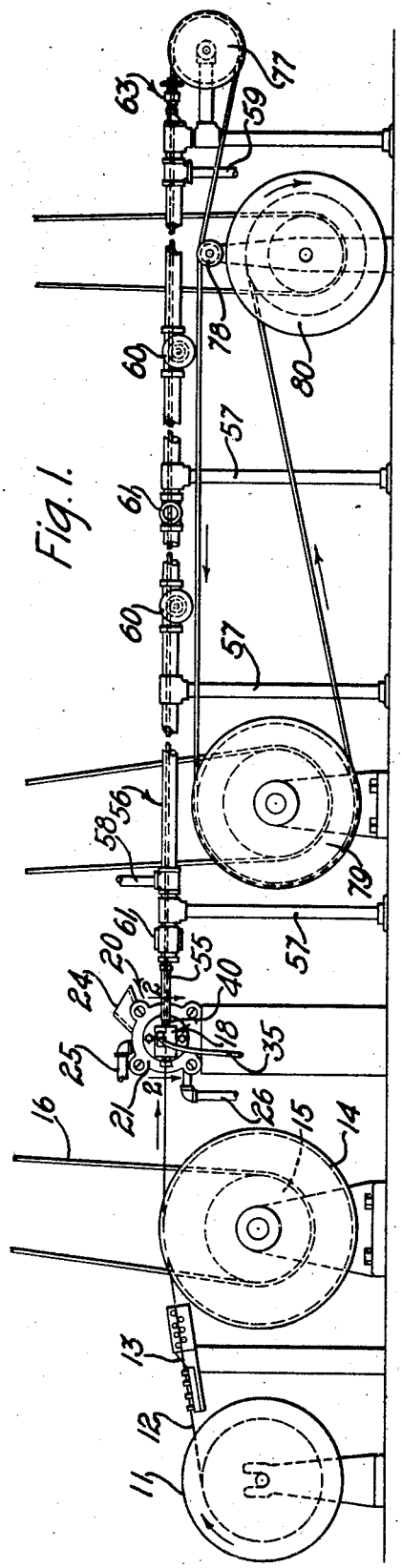
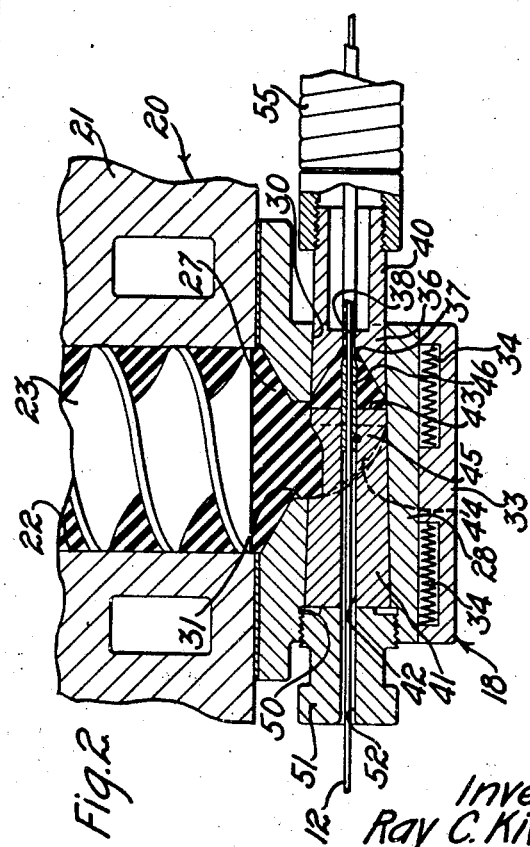
Inventor
Ray C. Kivley
by J. H. Pattison Att'y.

Patented July 22, 1930

1,770,985

UNITED STATES PATENT OFFICE

RAY CHARLES KIVLEY, OF OAK PARK, ILLINOIS, ASSIGNOR TO WESTERN ELECTRIC COMPANY, INCORPORATED, OF NEW YORK, N. Y., A CORPORATION OF NEW YORK

APPARATUS FOR CONTINUOUSLY SHEATHING CORES OF MATERIAL

Application filed May 29, 1926. Serial No. 112,599.

This invention relates to apparatus for continuously sheathing cores of material, and more particularly to apparatus for continuously applying a plastic insulating coating upon wires and cables.

The object of the invention is to provide an apparatus for continuously sheathing cores of material with a uniform coating of a vulcanizable material and means for effecting a pressure-tight connection between the sheathing apparatus and a vulcanizing apparatus.

According to the general features of the invention, a strand of the material to be sheathed, such as a wire or cable, is passed from a supply reel through an extruding mechanism provided with an extrusion head through which the strand passes, which extrudes a coating of unvulcanized insulating material upon the strand as it emerges therefrom. Connected to the extruding mechanism is a vulcanizing chamber into which the coated strand passes directly without access to the atmosphere and in which the insulating material is subjected to sufficient heat and pressure to vulcanize it. The strand, now covered with a vulcanized insulating coating, emerges from the vulcanizing chamber through a seal, which tends to maintain the pressure within the chamber, and is wound upon a storage reel where it may remain until used.

It is believed that the invention will be clearly understood from the following detailed description taken in connection with the annexed drawing, in which Fig. 1 is a side elevation of an apparatus embodying the invention;

Fig. 2 is an enlarged horizontal section of the extrusion mechanism taken substantially on line 2—2 of Fig. 1, and Fig. 3 is an enlarged detailed view of a part of the extrusion head.

It is, of course, to be understood that the above mentioned figures are illustrative only and that the invention is subject to any change or modification within the scope of the appended claims.

In the drawing, in which like numerals designate like members throughout the several views, one embodiment of the invention is illustrated which is adapted to cover an electric wire with an insulating coating of rubber. The apparatus embodying the invention is provided with a supply reel 11 from which a wire 12 which is to be covered is drawn through a wire straightening device 13 of any desired form by means of a capstan 14 around which the wire passes, the capstan being driven through a pulley 15 by means of a belt 16 connected to a suitable source of power (not shown), at a speed slightly greater than that of the wire in order to relieve the wire of tension during its passage through the vulcanizing tube, hereinafter described. From the capstan the wire passes through a head 18 of an extrusion mechanism, designated generally by the numeral 20, which is adapted to extrude a uniform coating of unvulcanized insulating material on the wire as it emerges from the head 18. The extrusion mechanism 20 comprises a jacketed body portion 21 provided with a central opening 22 (Fig. 2) in which operates a conveying screw 23 driven in any suitable manner, a hopper 24 being provided for supplying the insulating material 27 from the exterior of the extruding mechanism to the central passage 22. Suitable connections 25 and 26 leading to and from a constant temperature device of any suitable form are provided to convey a heated fluid into the jacket so that the material to be extruded may be constantly maintained at the optimum extruding temperature. The head 18 consists of a body portion 28 which is provided with a tapered passage 30 and an inlet passage 31 at right angles thereto which connects the tapered passage 30 with the passage 22. On the front face of the head 18, in the embodiment illustrated, is located a plate 33 carrying an electric heating element 34 which may be connected to a source of electrical energy by a plurality of conductors held in a common sheath 35. A removable, tapered, self-centering die 36 which is adapted to fit closely within the smaller end of the tapered passage 30 is provided with a conical shaped opening 37 leading into a small central opening 38 which is the diameter desired in the coating to be extruded upon the wire. The forward end of the die 36 extends exteriorly of the head 18 forming a nozzle portion 40, the end of which is threaded. A removable, tapered, hollow core tube 41 which is adapted to fit closely within the larger end of the tapered passage 30 is provided with a central wire passage 42 into which the wire passes from the exterior of the head. The forward end of the core tube is provided with an inclined or curved surface 44 adapted to direct the material to be extruded toward the die 36 and a fin or partition 45 adapted to divide the stream of insulating material into two portions, thereby distributing the insulating material evenly, the fin being provided with a beveled end 43 to reduce friction and to more evenly distribute the insulating material, and a central opening into which fits a smaller tube 46 provided with a central opening 47 which is only slightly larger than the wire 12. The rear end of the tapered passage 30 ends in an enlargement 50, the inner surface of which is threaded and into which a threaded plug 51, provided with a central passage 52, may be inserted for the purpose of forcing the core tube 41 tightly into the tapered opening 30.

Attached to the threaded end of the nozzle 40 is one end of a section of a flexible metal hose 55 of any suitable type capable of confining fluids at high temperatures and pressures. The other end of the metal hose is connected to an elongated vulcanizing tube 56 supported by a series of standards 57, which is provided with an inlet pipe 58 for conveying a heated non-oxidizing medium, such as steam, under pressure into the tube and an outlet pipe 59 forming an outlet for such medium or its condensate. When steam is used as the heated medium, the pipe 59 will preferably be connected to a steam trap. Located at equal intervals within the tube are a plurality of sheaves carried in castings 60 which guide the covered wire in its passage through the tube, while a plurality of sight glasses 61 are provided at intervals along the tube to permit examination of the wire therein, one being placed near the entrance end. At the end of the vulcanizing tube opposite the entrance end, there is provided a seal 63 which permits the covered wire to be drawn from the tube, but which prevents the escape of any great amount of the vulcanizing medium from the interior of the tube. The seal 63 may be of any suitable type, that described in the copending application Serial No. 112,600, filed May 29, 1926, by L. F. Lamplough, issued as Patent 1,689,205, dated October 30, 1928, being one which gives very satisfactory results. The vulcanized wire emerges from the vulcanizing tube 56 through the seal 63 and is drawn over a sheave 77 and idler 78 by means of a capstan 79 around which the wire passes before being wound upon a take-up reel 80, the capstan 79 and the reel 80 being suitably driven from a source of power (not shown) by means of pulleys and belts.

The operation of the device is as follows: The end of the uncovered wire 12 is threaded through the wire straightening device 13, around the capstan 14, through the head 18 of the extrusion device, through the connecting tube 55, the vulcanizing tube 56, and the seal 63, around the sheave 77 and capstan 78, and onto the take-up reel 79. Power is then applied to the various driven members and a quantity of unvulcanized insulating material, such as a rubber compound, is inserted into the passage 22 of the extruding head through the hopper 24. The conveying screw 23 forces a stream of the insulating material under high pressure past the fin 45 which divides the stream into two portions, thereby distributing it evenly around the tube 46, and against the curved or inclined surface 44 which deflects the material toward the die 36. The insulating material is forced by the pressure of the screw through the small central opening 38 of the die and forms a compact, uniform coating around the wire 12, which is passing therethrough. The operator upon looking into the sight glass 61 nearest the extrusion head may note when the extrusion material begins to appear within the vulcanizing chamber, when he will immediately admit the hot vulcanizing medium into the vulcanizing tube 56 through the pipe 58 whereupon the vulcanizing process begins. The coated wire continues through the vulcanizing tube 56, throughout which it is subjected to the vulcanizing temperature and pressure, and by the time the wire emerges through the seal 63 the coated material is vulcanized to the desired degree. Sufficient time elapses during the travel of the wire around the sheave 77 and the capstan 78 and onto the take-up reel 79 for the insulating material to cool. The material is wound upon the take-up reel 79 where it may be stored until used.

What is claimed is:

1. In a continuous core covering device, an extrusion mechanism provided with an extrusion head having a nozzle thereon, a vulcanizing chamber, and a flexible tube forming an air-tight connection between the nozzle and the chamber.

2. In a continuous core covering device, an extrusion mechanism provided with an extrusion head, a threaded nozzle upon the head, a vulcanizing chamber, and a flexible tube connecting the nozzle and the vulcanizing chamber.

3. In a core covering device, an extrusion mechanism provided with an extrusion head comprising a body portion having a tapered passage therethrough, a self-centering die in one end of the passage, and a self-centering core tube in the other end of the passage.

4. In a continuous core covering device, an extrusion mechanism provided with an extrusion head comprising a body portion having a tapered passage therethrough, a self-centering core tube in one end of the passage, a self-centering die in the other end of the passage provided with a nozzle extending exteriorly of the head, a vulcanizing chamber, and means for connecting the nozzle directly to the chamber.

5. In a core covering device, an extrusion mechanism provided with an extrusion head comprising a body portion having a tapered passage therethrough, a tapered self-centering die adapted to fit into one end of the passage, a tapered core tube in the other end of the passage provided with a central opening, and a fin thereon for dividing the material to be extruded.

6. In a continuous core covering device, an extrusion mechanism provided with an extrusion head comprising a body portion having a tapered passage therethrough, a tapered core tube at one end of the passage provided with a central opening and a fin thereon for dividing the material to be extruded, a tapered self-centering die adapted to fit into the other end of the passage and provided with a nozzle extending exteriorly of the head, a vulcanizing chamber, and means for effecting an air-tight connection between the nozzle and the chamber.

7. In a core covering device, an extrusion mechanism provided with an extrusion head and a pressure screw for forcing the material to be extruded through the head, the head comprising a body portion having a tapered passage therethrough and an inlet passage connected to the tapered passage to admit the extrusion material therein, a tapered self-centering die adapted to effect a close fit with the smaller end of the tapered passage, a tapered core tube provided with a central opening and adapted to effect a close fit with the larger end of the tapered passage, the inner end of the core tube being provided with a fin for dividing the extrusion material and a surface for deflecting the extrusion material toward the die and ending in a tube provided with an opening of such size as to be completely filled by the strand to be covered, extending toward the die.

8. In a continuous strand covering device, an extrusion mechanism provided with an extrusion head and a pressure screw for forcing the material to be extruded through the head, the head comprising a body portion having a tapered passage therethrough and an inlet passage connected to the tapered passage to admit the extrusion material therein, a tapered self-centering die adapted to effect a close fit with the smaller end of the tapered passage and provided with a threaded nozzle extending exteriorly of the head, a tapered core tube provided with a central opening and adapted to effect a close fit with the larger end of the tapered passage, the inner end of the core tube being provided with a fin for dividing the extrusion material and a curved surface for deflecting the extrusion material toward the die, and ending in a small tube provided with an opening of such size as to be completely filled by the strand to be covered, extending toward the die, an elongated vulcanizing chamber, and a flexible tube connecting the nozzle and the vulcanizing chamber.

9. In a core sheathing device, an extrusion mechanism provided with an extrusion head comprising a body portion having a central passage therethrough, a die in one end of the passage, means for forcing material into the passage and through the die, a core tube in the other end of the passage provided with a fin for dividing the material into two portions, the fin extending into contact with one side of the passage and being beveled on the end toward the die to reduce friction and to distribute the material evenly over the die.

10. In a core sheathing device, an extrusion mechanism provided with an extrusion head comprising a body portion having a central passage therethrough, a die in one end of the passage, means for forcing material into the passage and through the die, a core tube in the other end of the passage provided with a concave deflecting surface inclined with respect to the passage for deflecting the material toward the die.

11. In a core sheathing device, an extrusion mechanism provided with an extrusion head comprising a body portion having a central passage therethrough, a die in one end of the passage, means for forcing material into the passage and through the die, a core tube in the other end of the passage provided with a fin for dividing the material into two portions, the fin extending into contact with one side of the passage and being beveled on the end toward the die, the core tube also being provided with a spherical deflecting surface inclined with respect to the passage for deflecting the material toward the die, one wall of the passage being substantially tangent to the deflecting surface and the tangent to the surface drawn at the point of intersection of the surface with the opposite wall being substantially at right angles to the wall.

12. In a core sheathing device, an extruding mechanism comprising a die having a conical opening terminating in a tubular opening, and means for feeding sheathing material into the die including a deflecting surface and a fin mounted on the deflecting surface to evenly distribute the material fed into the die.

13. In a core sheathing device, an extruding mechanism comprising a die having a conical opening terminating in a tubular opening, means for forcing sheathing material into the die, and a fin for distributing the sheathing material as it approaches the die, said fin carrying a tube extending into the conical opening through which the core is led into the extruding mechanism.

14. In a core sheathing device, an extruding mechanism comprising means forming a passageway for sheathing material and terminating in an opening for the passage of the sheathing core, a die having a surface adapted to deflect sheathing material entering said passageway in the direction of said opening, and a fin mounted on the deflecting surface to evenly distribute the material on opposite sides thereof.

In witness whereof, I hereunto subscribe my name this 21st day of May, A. D. 1926.

RAY CHARLES KIVLEY.